AIR CONDITIONING SYSTEM

Original Filed June 3, 1964 4 Sheets-Sheet 1

INVENTOR.
CHARLES F. BEELER
BY
Marechal, Biebel, French & Bugg
ATTORNEYS

AIR CONDITIONING SYSTEM

Original Filed June 3, 1964 4 Sheets-Sheet 2

INVENTOR.
CHARLES F. BEELER
BY
Marechal, Biebel, French & Bugg
ATTORNEYS

AIR CONDITIONING SYSTEM

Original Filed June 3, 1964 4 Sheets-Sheet 3

INVENTOR.
CHARLES F. BEELER
BY
Marechal, Biebel, French & Bugg
ATTORNEYS

AIR CONDITIONING SYSTEM

Original Filed June 3, 1964 4 Sheets-Sheet 4

INVENTOR.
CHARLES F. BEELER
BY
Marshall, Bibel, French & Bugg
ATTORNEYS

United States Patent Office

Re. 26,430
Reissued Aug. 6, 1968

26,430
AIR CONDITIONING SYSTEM

Charles F. Beeler, % Automated Environment, Inc., Box 896, Hamilton, Ohio 45012

Original No. 3,247,894, dated Apr. 26, 1966, Ser. No. 372,165, June 3, 1964. Application for reissue Apr. 13, 1967, Ser. No. 637,022
13 Claims. (Cl. 165—16)

Matter enclosed in heavy brackets [ ] appears in the original patent but forms no part of this reissue specification; matter printed in italics indicates the additions made by reissue.

*ABSTRACT OF THE DISCLOSURE*

*An air conditioning system for a building wherein a separate perimeter system is provided to compensate for flow of heat into the building from the exterior. The windows include blinds which are automatically raised or lowered depending on whether sunlight is passing through the windows or not. An interior system is also provided to automatically regulate the temperature humidity and ventilation of the interior of the building.*

This invention relates to the art of air conditioning, and particularly to a process and apparatus for automatically heating, cooling, and regulating the humidity of air in a structure.

An important object of this invention is to provide an air conditioning system which is completely automatic so that the temperature, humidity and rate of ventilation of the air in the associated structure is controlled within optimum limits regardless of the outside temperature or humidity, the sun and wind loads, and the number of people within the structure.

Another object of this invention is to provide an air conditioning system which uses water at well temperature to heat or cool fresh air and subsequently mixes regulated amount of fresh and return air to achieve the desired air temperature for interior of a structure, and particularly to provide a closed perimeter system for substantially preventing the outside atmospheric conditions from affecting the conditions within the structure.

A further object of this invention is to provide a dual air conditioning system for a structure including a perimeter system for balancing all exterior heat loads, such as outside air temperatures and sun loads, and an interior ventilating system independent of the perimeter system for negating heat loads imposed by lights and people, as well as to heat, cool, humidify, dehumidify, and provide proper air motion for maximum comfort and ventilation.

Another object of this invention is to provide a window-blind combination which is automatically controlled to substantially restrict the amount of direct sunlight passing through the windows into the building, and particularly to provide such a window-blind combination wherein air is conducted therethrough to negate the inflow of heat or cold through the window.

Another object of this invention is to provide an automatic device for sensing sun load through a window and for actuating a blind to cover the window when a preset amount of sun load is present, and particularly to provide such a device which will average out frequent changes in sun loads and which is simple in construction and operation for dependability over long periods of time after installation.

Additional objects and advantages of the invention will be apparent from the following description, the accompanying drawings and the appended claims.

Figure 1:
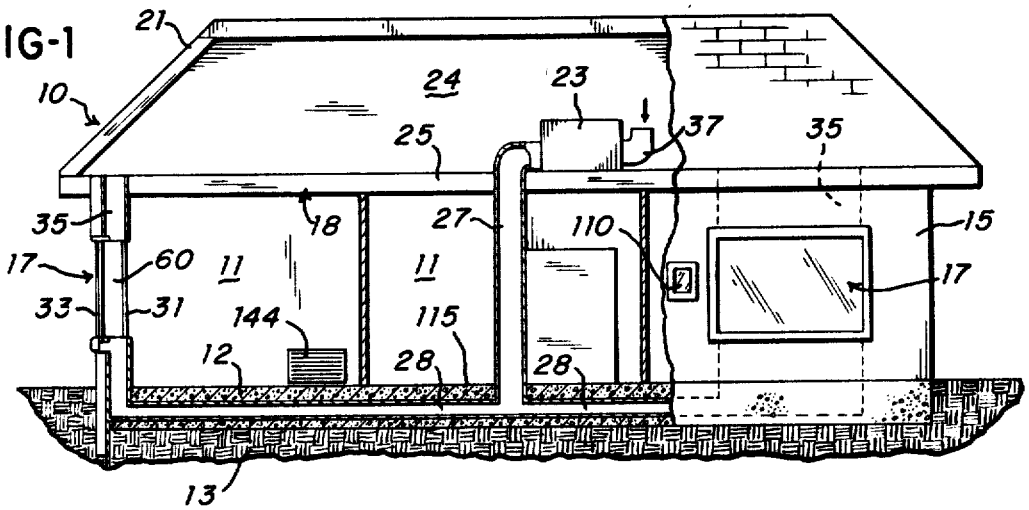
FIG. 1 is a front elevation, partially broken away, of a structure utilizing an air conditioning system in accordance with the invention.
Figure 2:
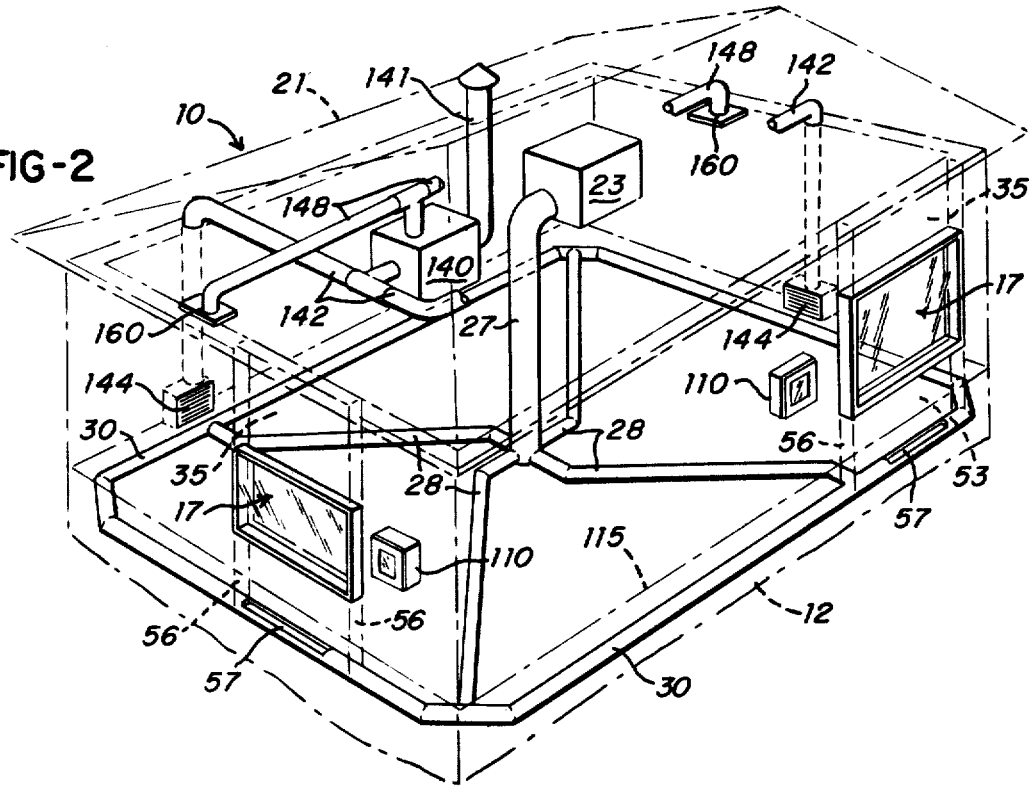
FIG. 2 is a somewhat schematic perspective view showing portions of the air conditioning system.

Referring to the drawings wherein a preferred embodiment of the invention is shown, FIGS. 1 and 2 illustrate schematically a typical dwelling or structure 10 in which the invention is utilized. While the structure is in the form of a small home having a number of separate rooms 11 and built on a concrete slab 12 on the ground 13, it is within the scope of this invention to use the system with buildings having very large floor area and many separate rooms or enclosurese. The air conditioning system includes perimeter and interior systems, with the former substantially eliminating any heat transfer through the side walls 15 and ceiling 18 of the structure, including the passage of radiant heat through the windows 17. The separate interior system is used to control the temperature, humidity and ventilation within the interior of the structure, as well as to recirculate the air through the interior of the structure. For convenience in understanding the invention the perimeter system will be completely described before the interior system.

Perimeter system

As indicated above, the perimeter system negates heat flow from outside air temperature and sun loads into the interior rooms 11 of the structure 10. The exterior walls 15 of the structure are well insulated so that there is negligible heat flow therethrough, and there similarly will be only a small negligible amount of heat flow into the structure through the floor 12. Heretofore the outside air temperature affects the interior air temperature primarily by heat flow through the windows 17, the ceiling 18 and roof 21.

The perimeter system includes a heat exchanger-blower unit 23 mounted in the attic space 24 on the ceiling rafters 25, or any other convenient location in the building. The unit 23 has a downwardly extending outlet 27 through which air flows to the horizontal supply ducts 28 imbedded in the floor 12. These supply ducts 28 each connect to a perimeter duct 30 disposed around the entire slab 12 at the base of the exterior walls 15. From the perimeter duct 30 the air passes upwardly between parallel panes of glass 31 and 33 of each of the windows 17, and into the attic space 24 through the ducts 35 directly above each of the windows 17. The attic space 24 acts as a plenum or collection chamber since all of the air from the perimeter duct 30 flows through the windows 17 and into this space. By moving a sufficiently large amount of air through the system, the air in the attic space 24 acts to prevent the flow of heat between the roof 21 and the ceiling 18. The inlet 37 of the unit 23 receives air only from the attic space 24 so that this perimeter system is substantially a closed system, and this is possible since the air in this system doe not contact human beings so that it is not a requirement that the humidity thereof be regulated.

Figure 5:
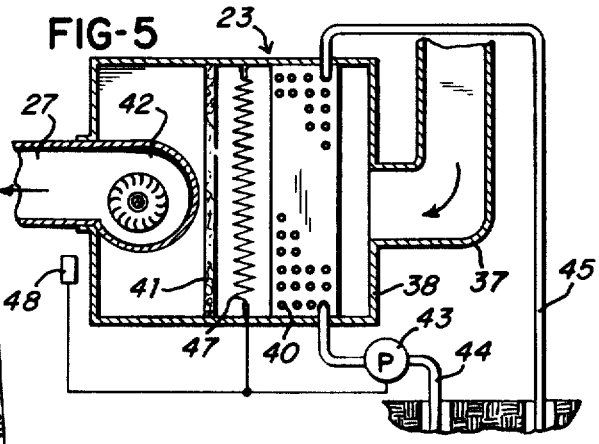
FIG. 5 is a schematic view similar to FIG. 3 showing the heat exchanger unit of the perimeter system.

The heat exchanger-blower unit 23 is shown in FIG. 5 and includes an air duct inlet 37 which connects the interior of the housing 38 to the attic space 24. As the air is drawn into the housing, it passes over the cooling coils 40 and through the filter 41, and into the blower 42 which forces the air into the outlet duct 27. The cooling coils 40 are supplied with well water at 55° F. or its equivalent by the pump 43 through the pipe 44 and this water is returned to the ground through pipe 45 after passing through the coils 40. Since the well water is always at approximately 55° F. it is capable of providing all cooling requirements for the interior system, as will be seen.

The heating coils 47 are interposed in the housing between the coils 40 and the filter 41 and are, for example, electric resistance heating coils or hot water coils for warming the air during the winter months. Suitable thermostats are provided for controlling the pump and the electric supply to the heating coils so that the output air temperature remains constant, for example, the thermostat 48 in the duct 35 controls the flow of electrical current to the heating coil 47 and to the pump 43, thus controlling cooling also.

Figure 6:
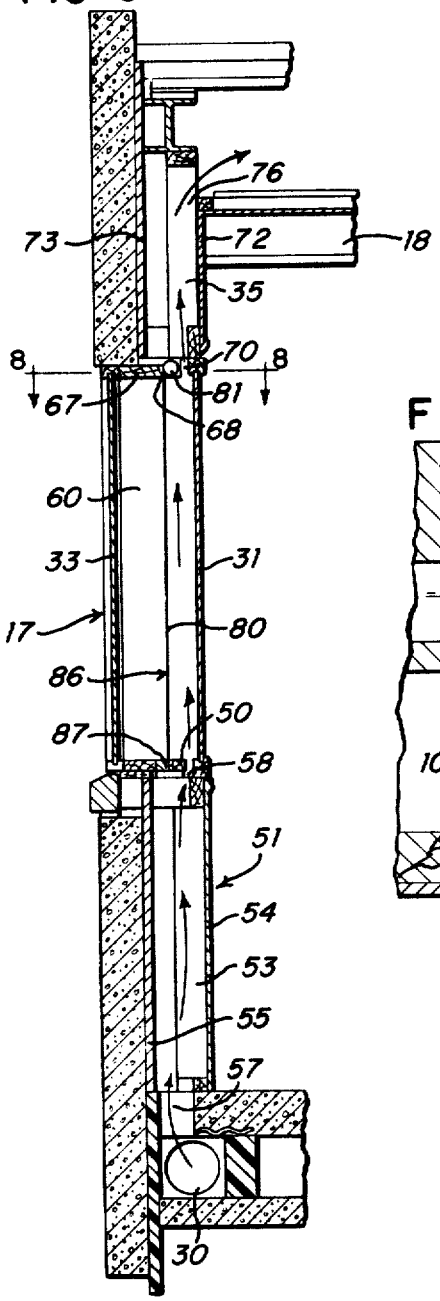
FIG. 6 is a vertical sectional view through one of the windows.

Each of the windows 17 includes a sill 50 having the inner and outer glass windows 31 and 33 supported thereon in spaced relationship, as shown in FIG. 6. The wall structure 51 immediately below the sill 50 includes a lower vertical passage 53 defined between the inner and outer walls 54 and 55, and on the vertical sides by the wall studs 56 (FIG. 2). The passage 53 communicates at its lower end through the opening 57 with the perimeter supply duct 30, and at the upper end through the slot 58 in the sill 50 with the space 60 between the windows 31 and 33.

Figure 8:
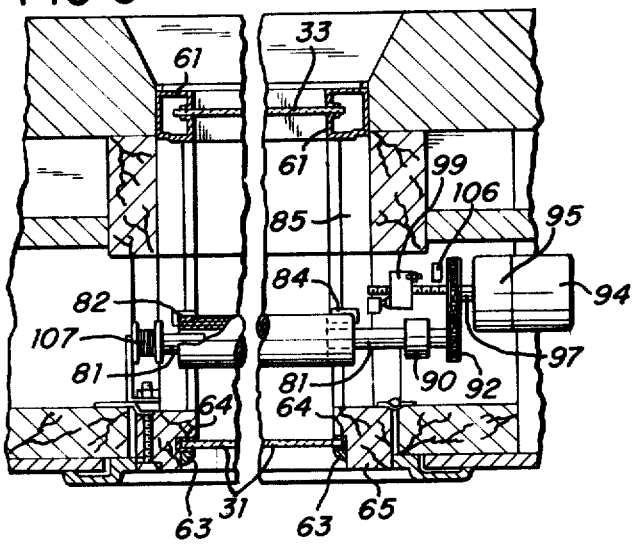
FIG. 8 is a horizontal sectional view taken along the line 8—8 of FIG. 6.

As shown in FIGS. 6 and 8, the outer window 33 is supported around its entire periphery by the metal molding members 61 whereas the inner window 31 is held in place by the wooden molding strips 63 which are nailed in place and clamp the glass against the shoulder 64 on the window frame member 65. The structure at the top of each window 17 includes an upper plate 67 having its innermost edge portion 68 spaced from the parallel 69 edge of the horizontal member 71 to define a slot 70 through which air from the space 60 will pass upwardly into the upper passage 35 defined between the inner and outer walls 72 and 73 and the vertical studs 56. The lower entrance of the slot 70 is covered by a perforated shield 75 secured to the wooden member 71 mounted horizontally above the window 31 for the purpose of improving the appearance of the slot entry. The upper end of the passage 35 connects to the attic space 24 above the ceiling 18 through the opening 76.

Figure 7:
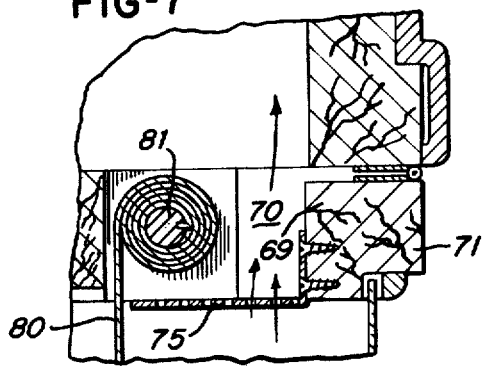
FIG. 7 is an enlarged sectional view of the upper portion of the window.

Each window 17 also has an automatic shade 80 disposed between the window glasses 31 and 33 for restricting the passage of sunlight into the interior of the structure 10 as well as heat in the winter months. These shades are preferably substantially opaque and white or egg shell in color so that some light but little sun radiation passes therethrough. Each shade 80 is mounted on a roller 81 (FIG. 7) and the side edges 82 thereof ride in the vertical grooves 84 formed in the side members 85. The leading edge 86 of the blind 80 is weighted and rests in the groove 87 in the sill 50 when the blind is fully extended so that it completely closes the associated window 17. In this closed position, the air flows between the inner glass 31 and the blind 80 so that the temperatures adjacent the inner window 31 are more closely controlled.

Figure 4:
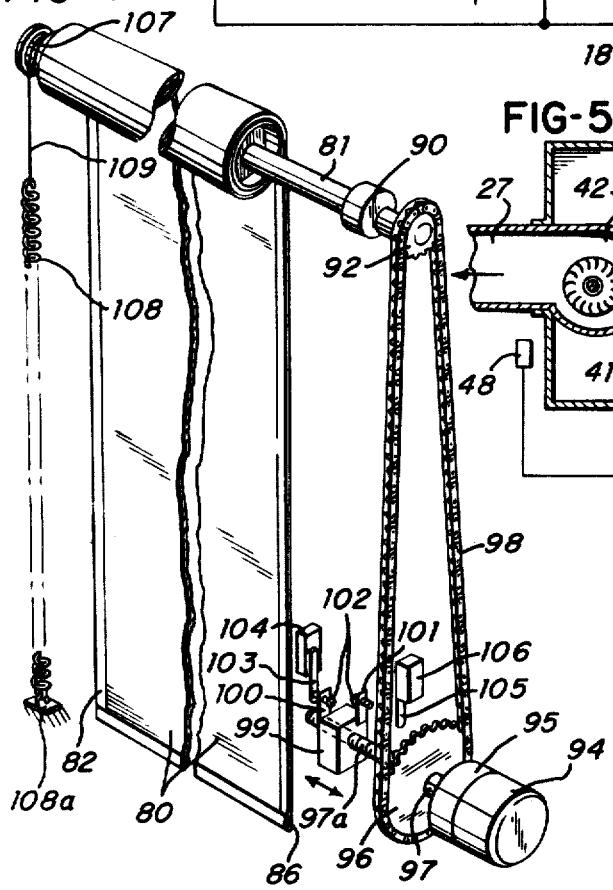
FIG. 4 is a perspective view of the blind operating mechanism.

The automatic operating mechanism for the shade 80 is shown in FIGS. 4, 6 and 8 and includes the bearing members 90 which support the opposite ends of the roller 81. The roller 81 has a chain sprocket 92 secured rigidly thereto, and the drive motor 94, having a gear reduction unit 95 thereon which rotates the chain sprocket 96 mounted on its drive shaft 97, is mounted within the wall structure below the sprocket 92. The drive chain 98 interconnects these sprockets so that rotation of the motor effects rotation of the shade roller 81 to raise and lower the shade 80.

Also mounted on the drive shaft 97 of the gear reduction unit 95 is a block 99 which reciprocates by rotation of the threaded portion **97*a* of the shaft 97 through the similarly threaded bore in the center thereof. This block has a pair of upwardly extending arms 100 and 101 each of which has an adjustment screw 102 thereon. As the motor 94 rotates to lower the shade 80, the arm 100 contacts the operating lever 103 of the switch 104 when the shade is lowered to terminate operation of the motor. When the shade is being raised, the operation of the motor 94 is terminated by contact of the arm 101 with the operating lever 105 of the switch 106**, which occurs when the shade is in its fully retracted position to block the flow of sunlight through the associated window.

A counterweight mechanism is applied to the shade 80 to reduce the size of motor 94 required to raise and lower the shade. This mechanism includes a reel 107 mounted on the left-hand end of the roller 81, as shown in FIG. 4. A relatively long coil spring 108 has one end connected rigidly to a portion **108*a* of the adjacent window structure and the other end connected to a flexible line 109 which winds on the reel as the roller rotates. The amount of force required to extend the spring 108 increases proportionally to the degree of extension thereof. Thus the spring 108 exerts a maximum force when the shade 80 is lowered in the direction tending to wind the shade 80 on the roller thus reducing power required of the motor. When the shade 80** is in its retracted position, the spring exerts a minimum force thereon since essentially no counterbalancing force is required.

Automatic blind control

Figure 9:
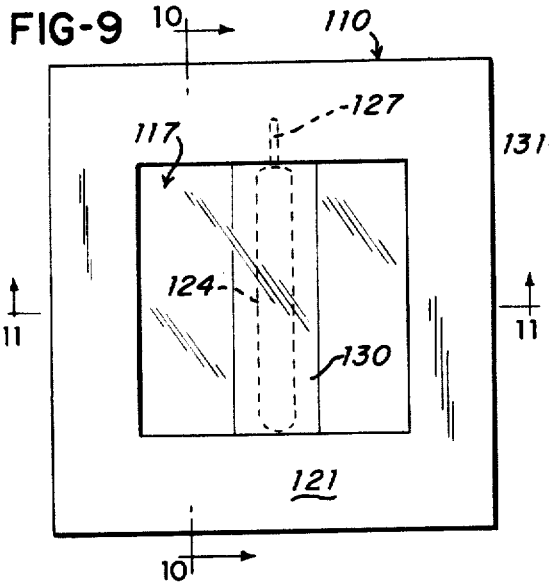
FIG. 9 is a front elevation view of the sunlight sensing device.
Figure 10:
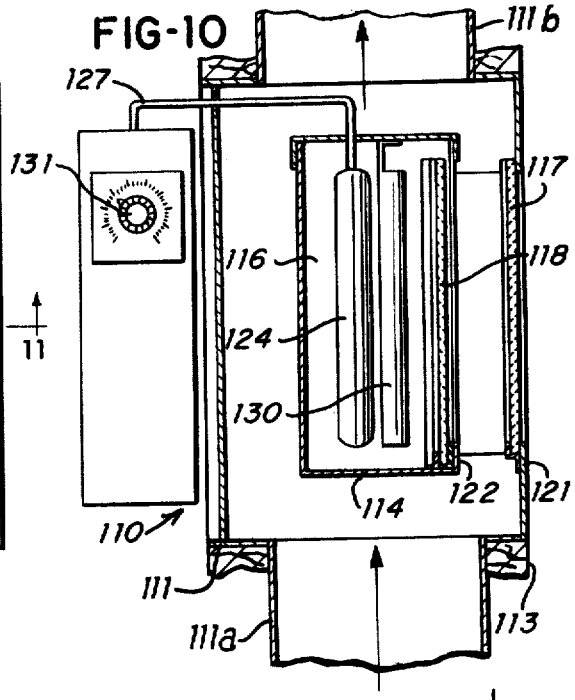
FIG. 10 is a sectional view taken along the line 10—10 of FIG. 9.
Figure 11:
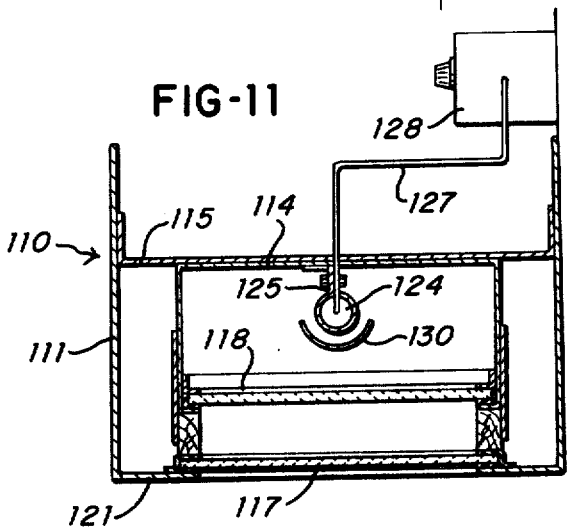
FIG. 11 is another sectional view taken along the line 11—11 of FIG. 9.

An automatic blind control unit 110, shown in FIGS. 9–11, is preferably provided for the windows on each exposure of the structure 10 to open and close the blind 80 thereof when a predetermined amount of sunlight is passing through the associated window 17. It is also possible to place only one of these control units 110 on each side wall of the structure 10 to control the blinds 80 of the windows on this particular side, since normally the sunshine will be uniform on each exterior wall of the structure.

Each control includes an outer box 111 which is mounted in an exterior wall 15 of the structure 10 with the righthand end of the box 111 being flush with the outer face 113 of this wall. Mounted within the outer box 111 is an interior box 114 which is secured in place by the strap 115 fastened to the outer box 111, as best shown in FIG. 11. The inner box 114 contains the heat sensors in order to duplicate the conditions within the interior of the structure, room air is circulated around the box 114 as it passes from the inlet **111*a* to the outlet 111*b*. The entrance for sunlight radiation through the outer box 111 to the interior 116 of the inner box 114 is by way of apertures 117 and 118 in the front walls 121 and 122 of the boxes 111 and 114, respectively. These apertures have dimensions which are proportional in size to the window panes 31 and 33 whose shade 80 is being controlled by this unit. That is, it is necessary to admit the same amount of light into the unit 110, as through the larger windows 31 and 33 in order to sense properly the amount of sunlight passing into the structure 10. Mounted in these apertures are small glass panes which are constructed of glass substantially identical to that used in the window panes 31 and 33, and these panes are spaced apart a distance equal to the inner and outer windows 31 and 33 so that the amount of sunlight passing into the control unit 110 is proportional to that passing through the associated window 17**.

The inner box 114 is closed on each of the other five sides thereof, and an elongated bulb element 124 filled with volatile liquid is mounted centrally therein by the bracket 125 which surrounds the center of the bulb element 124. This bulb is a conventional device for making or breaking electrical circuit in response to the rise or fall of temperature thereof, and the pressure conduit 127 extends therefrom to the thermostat 128. An elongated arcuate shield 130 may be interposed between the glass pane in the aperture 118 and the bulb 124 to keep direct sun radiation off the bulb and to dampen the changes in intensity of the sunlight. This shield is painted black to convert sun radiation to heat which will affect the ambient air temperature in the box 114. The bottom and top of the outer box 111 are open for flow of circulation of air around the inner box 114 so that heat therein is gradually dissipated at a uniform rate.

The bulb 124 and thermostat 128 cooperate to sense the temperature of the air behind the shield 130 so that a circuit to the motor 94 for the shade 80 is completed to lower the shade when a certain preset temperature is reached and to raise the shade when the temperature drops below a preset level. These preset levels may overlap so that the shade 80 is not actuated by small temperature changes. The shield 130 also reduces the frequency at which the shade 80 will be raised or lowered since it absorbs heat so that when a cloud momentarily interrupts the sunlight, the temperature in the inner box will not change sufficiently to effect raising of the shade. The temperature at which the control unit completes a circuit to the motor 94 may be varied by adjusting the dial 131 on the thermostat in a conventional manner. The dial 131 may be adjusted so that it is sensitive enough to prevent overheating of the rooms, and is sluggish enough to avoid annoying up and down movement at every slight amount of sunlight. In addition, the control unit is provided with manual override switches so that it can be raised or lowered manually.

In operation of the perimeter system, the heat exchanger-blower unit 23 continually circulates air through the perimeter duct 30 at the base of each of the exterior walls 15. Thus any heat flowing into or from the interior of the structure 10 at the base of these walls will be absorbed by the air flowing through this duct. The air flows from the perimeter duct 30 upwardly through each of the windows 17, in the manner already described, and then upwardly into the attic space 24 which acts as a plenum or collection chamber thereby restricting the flow of heat through the windows 17, and the roof 21 to the ceiling 18. The inlet duct 31 of the inlet 23 then draws the air from the attic space 24 back into the unit 23, and the cycle is again completed. In this manner the flow of heat into or from the structure 31 through the various walls, ceiling, and windows is substantially negated so that the only consideration in heating the interior thereof, is the heat generated by the presence of human beings and by the lights in the structure.

When the sun is not shining the automatic blind control unit 110 will position the shades 80, in their open position, unless the control unit has been overridden by a desire to close the blinds notwithstanding absence of sunlight. Once the sun begins to shine, the units 110 properly sense the same, and cause the shades 80 to be removed to their lowered position wherein they block the flow of sun rays in the room thereby eliminating another source of heat addition to the interior of the structure.

Since the shade 80 is provided with manual controls therefor, it may be desirable to lower the shades during cold weather, especially in the hours that the structure is unoccupied or during the night hours, so that the window structures will be even more effective in reducing the flow of heat therethrough. When the shades are lowered the flow of air between the glass panes 31 and 33 is between the shade 80 and the inner pane 31 so that the air moves in a restricted path to reduce heat transfer through the windows. The shade 80 also acts as an insulating device to reduce heat flow therethrough.

Interior system

As indicated above, the function of the interior system is to supply a certain volume of air at a predetermined temperature and humidity to the interior room 11 of the structure 10. This air must include a certain amount of fresh air at all times in order to eliminate stale air from the system, and this fresh air is the air that has its temperature and humidity conditions changed to predetermined levels.

The system includes a central heat exchanger unit 140 (FIG. 2) having an inlet duct 141 connected to the outside air through the roof 21, one or more outlet ducts 142 leading to outlet grills 144 adjacent the floor 115 in the various rooms 11 of the structure, and a return duct 148 leading from the opening 160 in or adjacent the ceiling 18 in each of the separate rooms. While particular location for the outlet and return opening 144 and 160 have been shown, these locations could vary throughout the six sides of each room 11 in accordance with established practice.

Figure 3:
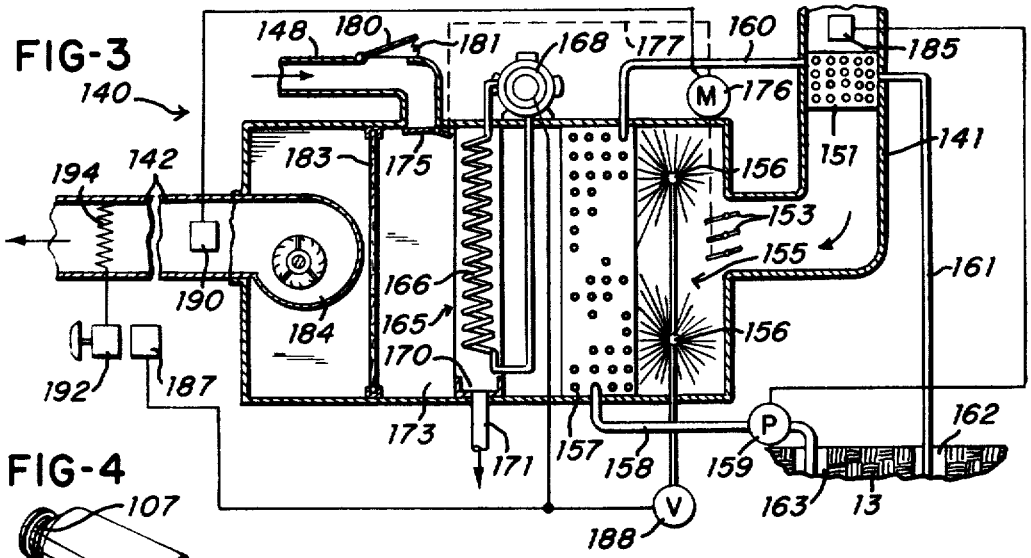
FIG. 3 is a schematic view showing the heat exchanger unit of the interior system.

The heat exchanger unit 140 forms an important part of the invention in that it inexpensively and efficiently maintains the correct temperature, humidity and ventilation combination within the structure 10. The unit 140, as seen in FIG. 3, includes the preconditioning coils 151 mounted in the inlet duct 141 for heating or cooling the inlet air from outside the structure. That is, the coils 151 have well water at about 55° F. circulated therethrough so that it cools air above 55° F. and heats air below 55° F. The rate and amount of outside air flow into the unit 140 is regulated by the dampers 153 mounted at the end of the inlet duct and capable of completely opening and completely blocking the flow of air into the chamber 155. The chamber 155 has the spray heads 156 mounted therein for adding moisture to the air as required to achieve a preset humidity, as will be described.

The heating-cooling coils 157 are disposed in the unit 140 adjacent the humidification chamber 155 for changing the temperature of the inlet air to a preset value which, for purposes of explanation will be stated to be 55° F. Thus if the air entering the coils 157 is warmer than this temperature it is cooled to about 55° F., whereas if it is colder it is warmed to this preset temperature. The coils 157 are supplied with a continuous flow of well water through the pipe 158 from the pump 159, and since this water is normally 55° F. no exterior heating or cooling is required to achieve the desired temperature of about 55° F. From the coil 157 the well water flows through the pipe 160 to the preconditioning coil 151, and from this coil 151 through the pipe 161 to the ground return 162 which is positioned at a point remote from the well 163.

After the air passes through the coil 157 it enters a dehumidification unit 165 wherein the moisture content of the air is reduced if the controlling humidistat senses that the humidity is above the desired level. The unit 165 includes coils 166 through which a refrigerant is pumped and expanded by the compressor 168 so that when in operation, the coils 166 are quite cold (25° to 35°) causing moisture in the air to be condensed thereon and collected in the trough 170 which leads to the drain 171. The use of well water in the coils 151 and 157 is much less expensive than comparable refrigeration units, and this use of dual coils permits humidity to be effectively increased therebetween while obtaining a uniform output temperature from the downstream coil 157.

The air passes from the dehumidification unit 165 into the mixing chamber 173 wherein a regulated amount of return air may be mixed therewith to achieve the desired temperature. The return air duct 148 is connected to the top of the chamber 173 and the flow into the chamber is controlled by damper 175 operated by motor 176 through the linkage 177, as will be explained. A relief valve 180 is positioned in the return duct 148 for exhausting return air to the outside when the damper 175 is partially or entirely closed and the pressure build-up in this duct 148 opens this valve against the bias of the spring 181 which urges the valve 180 to its closed position. From the mixing chamber 173, the air is drawn through the filter 183 and into the blower 184 which forces the air into the outlet duct 142.

The controls for the interior system are best explained in connection with the operation of this system. Thus, assuming that outside air is very cold, for example 0° F. to 32° F., the dampers 153 will be opened somewhat so that fresh air is drawn into the system through the inlet duct 141. These dampers are never entirely closed since it is desired to always use at least 50% fresh air in the system for proper ventilation. Since this air is substantially below 55° F. the thermostat 185 in the inlet duct 141 completes a circuit to the pump 159 causing well water to be pumped through the pipes 163 and 158 to the coils 157 and 151 and returned to the ground through the pipe 161. The water passing through the coil 151 is approximately 55° F. so that the incoming air is preheated, for example, to 45°–52° F. If the humidity of the air in the interior 11 of the structure 10, as sensed by the humidistat 187, is below that desired, a circuit to the valve 188 will have been completed to open the valve causing water to be sprayed from the nozzles 156 in the chamber 155. Thus as the air from the inlet duct 141 passes through the chamber 155 its moisture content is substantially increased and the action cools the air a few degrees, and this is greatly facilitated in cold weather by the coil 151 which preheats the air to the sensible range wherein a substantial amount of moisture can be added.

From the chamber 155 the air passes into the primary coils 157 which have water at about 55° F. passing therethrough and which heat the air, for example to about 50°–55° and 80% relative humidity. The air then flows into the dehumidification chamber 165 and past the coils 166 which are inoperative when the inlet air humidity in the structure is below a preset minimum. Next the air flows into the mixing chamber 173 wherein it is mixed with a regulated amount of return air from the return duct 148 as controlled by the position of the damper 175. The motor 176 positions each of the dampers 153 and 175 in response to the thermostat 190 mounted in the outlet duct 142 to issure that the unit is producing air at a preset temperature, for example 65° F.

That is, when the temperature in the duct 142 is below the setting, the motor 176 is actuated to open the return dampers 175 and close the inlet damper 153, to supply more of the warmer return air and less of the colder fresh air. When the temperature in the duct 142 is above the setting, the converse is true, in that less return air is added to more of the colder inlet air to reduce the output to the desired setting. After the air is mixed in the chamber 173, it passes through the electrostatic filter 183 and is drawn into the blower 184 which forces it into the outlet duct 142.

The air then flows through the various branches of the outlet duct 142 and into the interior 11 of the room of the structure 10 through the conventional outlets 144. Each room has a thermostat 192 (FIG. 3) therein which controls a small electrical strip heater 194 near the outlet 144 in the room to add additional heat, if necessary, to the 65° air flowing through the duct 142. Thus a person in the room can set the temperature in the room at 70° F. or 75° F., etc., depending upon his desires. The air thus flows through the rooms 11 and into the return outlet 148, and this air is almost always at a temperature above 65° F. since it absorbs heat from lights and people in the structure, and if it does not, the heaters 194 will add additional heat to reach 75° F. The strip heaters 194 are, in fact, not required in many situations where the structure is in normal use. The temperature in each room 11 is varied quickly since the strip heaters 194 promptly raise the temperature of the air flowing into each room and since there is a substantial continuous flow through the system.

As the outside temperature rises, the thermostat 185 in the inlet duct senses the increased temperature of the resulting air and causes the motor 176 to close the dampers 153 to admit a larger volume of this inlet air. The dampers 175 in the return duct, of course, are proportionately closed to reduce the amount of the warmer return air. Once the temperature outside reaches a preset point, for example 55°, the thermostat 185 senses the same and opens the circuit to the pump 159 to terminate flow of the well water through the coils 151 and 157. At this temperature, the air can pass into the mixing chamber 173, without being heated or cooled, although the humidification and dehumidification units will work to regulate the desired humidity. The pump 159 remains inactive between the temperature ranges of 55–65° F., and at this higher point all of the air being treated by the system is fresh air, unless a small amount of return air is added to compensate for cooling of this air due to the operation of the humidification sprays 156.

Once the outside air temperature rises above 65°, the thermostat 185 again senses this temperature and actuates the pump 159 causing well water at 55° F. to again be pumped through the coils 157 and 151. Since this well water is at 55° F. the inlet air will then be cooled from the higher temperature down to approximately 62°. As the air passes into the mixing chamber 173, a certain amount of return air is added thereto so that the temperature of the air passing into the outlet duct is always at approximately 65° F. As the outside air becomes very warm, for example 95° F., it flows over the preconditioning coils 151 and is initially lowered in temperature, and then through the primary coils 157 wherein its temperature is reduced to approximately 60° F. so that a certain amount of return air must be added in the mixing chamber 173 and the resulting outlet air is at the 65° F. point. The 65° F. temperature is assumed to be adequate for air cooling during the summer season.

During the time that the air outside is quite warm, the humidity thereof will generally require reduction in order to present a comfortable atmosphere within the structure. This high humidity is sensed by the humidistat 187 within the structure 10 which activates the compressor 168 which compresses a conventional refrigerant and allows it to expand through the coils 166 which thereby become very cold. The incoming air passes over these coils and a portion of the moisture condensed thereon and is drained from the unit through the trough 170 and the drain 171 to reduce the moisture content of the air. The controls for the humidifying and dehumidifying operations may be such that they operate for a set period, e.g. eight hours, once they are placed in operation to prevent frequent off-on operation of these units, and this is possible since outside humidity changes are quite slow.

While the specific structure has been shown and described, it is within the scope of the invention to adapt the system to other type structures. For example, in a large building with many windows therein, it may be desirable to use a separate perimeter system for the window of each exterior wall since the heat loads will be substantially different on each of these exterior walls. Moreover, use of the attic space as a collection chamber may be replaced with a system of ducts which will accomplish the same results. The ceiling 18 also could include a system of ducts which would receive air through perforated ceiling panels and return the same to the interior unit 140.

While well water is preferred for this invention since it has a uniform temperature and is particularly useful for heating and cooling in the present system, it is possible to use a refrigeration unit to supply the required flow of 55° F. liquids through the coils 40, 151, and 157. Similarly, other types of heating devices may be used to supply the necessary additive heat to the perimeter and interior air.

The invention has thus provided a highly improved air conditioning system capable of inexpensive operation to maintain the temperatures within the structure at a preset point regardless of the outside atmospheric condition or the number of persons present within the structure. The perimeter system prevents any substantial amount of heat flow between the outside and the interior of the building, whereas the interior system controls the condition within the structure for optimum temperature, humidity, and air flow or ventilation at all times. A novel shade and shade control are used to block the passage of radiant sun energy into the structure.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. An air conditioning system for a building having a plurality of windows therein comprising, a perimeter system for negating the flow of heat into and from the building, said perimeter system including the windows each of which includes inner and outer panes spaced apart a predetermined distance to define a space therebetween, means defining inlet and outlet passages from said space on different portions of said windows, an automatically-controlled blind responsive to radiant sunlight energy passing through said outer pane for blocking the passage of direct sunlight through said inner pane, said blind disposed between said inlet and outlet passages and said outer pane, a perimeter air conditioning unit for heating and cooling air to a preset temperature, duct means for connecting said inlet passage to the outlet of said unit and said outlet passage to the inlet of said unit, an interior air conditioning unit including supply and return ducts to and from the interior of the building, a fresh air inlet duct to said interior unit, means associated with said fresh air inlet duct for heating the air which passe therethrough to a preset temperature, said interior unit having means defining a mixing chamber, an air moving device for forcing air from said chamber through said supply duct, and automatically controlled damper means in said fresh air duct and said return duct for controlling the flow of the return and fresh air into said mixing chamber so that the flow of air into said supply duct is constantly maintained at a substantially preset temperature..

2. An air conditioning system as defined in claim 1 wherein said inlet passage connects to said space at the bottom of said window and said outlet passage connects to said space at the top of said window.

3. An air conditioning system as defined in claim 1 wherein said automatically controlled damper means includes thermostatically controlled actuator means connected to said damper means for regulating the volumes of inlet and return air which flows into said mixing chamber so that the temperature in said outlet of said unit remains a constant preset value.

4. A perimeter air conditioning system for a building having a plurality of windows therein comprising, heat exchanger means for supplying conditioned air under pressure to each of said windows, each of said windows including a window frame defining a window opening to the building, inner and outer spaced glass window panes mounted in said opening for closing each said opening, an inlet opening in one portion of said window frame for the flow of air uniformly through the space between said glass panes, an outlet opening in another portion of said frame for venting air from said space between said panes, means for connecting said inlet openings to said heat exchanger means for air flow through said space to negate the flow of heat between said panes, a blind disposed between said inlet and outlet openings and said outer glass pane of each window, said blind being movable to a first position to block the flow of radiant light energy through said inner pane and to a second position wherein radiant light energy passes through said panes, control means responsive to radiant sunlight energy passing through said outer panes for moving said blind to said first position to block the flow of radiant sun energy through said inner glass panes, means for connecting said outlet openings to the inlet to said heat exchanger means, and means for connecting said inlet openings to the outlet of said heat exchange means.

5. An air conditioning system as defined in claim 4 wherein an interior heating system is provided for conditioning the air within the building, said interior system having a heat exchanger unit which includes a housing having a fresh air inlet, a preconditioning coil in said inlet, a heat exchanger coil in said housing downstream from said inlet, means for pumping well water through each of said coils to heat or cool the air passing thereover to a preset temperature, means defining a mixing chamber downstream of said heat exchanger coil, a return air duct connecting the interior of said structure with said mixing chamber, fan means for drawing air from said mixing chamber and forcing the same into an outlet duct leading to the interior of said structure, damper means in said inlet air ducts for regulating the flow of air through each of said ducts and into said mixing chamber, and thermostatically controlled actuator means connected to said damper means for regulating the volumes of inlet and return air which flows into said mixing chamber so that the temperature in said outlet duct remains a constant preset value.

6. A perimeter air conditioning system as defined in claim 4 wherein said blinds include a flexible blind member, roller means having one end of said blind member secured thereto, bearing means for supporting said roller means for rotation, and motor means for rotating said roller means to roll and unroll said blind member thereon for movement between said first and second positions.

7. An air conditioning system as defined in claim 4 wherein said inlet and outlet openings are connected between said blind and said inner pane when said blind blocks the flow of direct radiant sun energy through said inner pane.

8. An air conditioning system as defined in claim 4 wherein said control means for said blind include roller means having one end of said blind secured thereto, bearing means for supporting said roller means for rotation, an electric motor for rotating said roller means to roll and unroll said blind thereon for movement between a stored position and an extended position, speed reduction means disposed between said motor and said roller means for reducing the speed at which said roller means rotates, a pinion secured to the drive shaft of said motor, a reel on said roller means, spring means having one end secured in a fixed position, a flexible cord connected to the other end of said spring for winding on said reel as said blind is unrolled to provide a counterbalance effect to the weight of the blind and thereby reduce the size of said motor.

9. An air conditioning system as defined in claim 4 wherein means are provided for effecting movement of said blind independent of said control means.

10. An air conditioning system as defined in claim 4 wherein said inlet passages are at the bottom of said windows and the outlet passages are at the top thereof.

*11. An air conditioning system as defined in claim 4 wherein said inlet opening is disposed below said inner*

*and outer panes and said outlet opening is disposed above said panes for vertical flow between said panes to negate the passage of heat into the building through the windows.*

*12. An air conditioning system for a building having at least one window therein comprising, heat exchanger means for supplying conditioned air under pressure to each of said windows, each of said windows including a window frame defining a window opening to the building, inner and outer spaced glass window panes mounted in said opening for closing each said opening, an inlet opening in one portion of said window frame for the flow of air uniformly through the space between said glass panes, an outlet opening in another portion of said frame for venting air from said space between said panes, means for connecting said inlet openings to said heat exchanger means for air flow through said space to negate the flow of heat between said panes, a blind disposed in said space between said inner and outer glass panes of said windows, said blind being movable to a first position to block the flow of radiant light energy to said inner pane and to a second position wherein radiant light energy passes through said panes, control means for moving said blind between said open and closed positions to regulate the amount of radiant sun energy passing through said inner pane, means for connecting said outlet openings to the inlet to said heat exchanger means, and means for connecting said inlet openings to the outlet of said heat exchanger means.*

*13. A perimeter air conditioning system for a building having at least one window therein comprising, heat exchanger means for supplying conditioned air under pressure to each of said windows, each of said windows including means defining a window opening to the building,*

*inner and outer spaced glass window panes mounted in said opening for closing each said opening, an inlet opening in one portion of said windows for the flow of air uniformly through the space between said glass panes, an outlet opening in another portion of said windows for venting air from said space between said panes, means for connecting said inlet openings to said heat exchanger means for air flow through said space to negate the flow of heat between said panes, blind means associated with said inner and outer panes of each said window, said blind means being movable to a first position to block the flow of radiant light energy through said inner pane and to a second position wherein radiant light energy passes through both of said panes, control means responsive to radiant sunlight energy passing through said outer panes for moving said blind means to said first position, means for connecting said outlet openings to the inlet to said heat exchanger means, and means for connecting said inlet openings to the outlet of said heat exchanger means.*

References Cited

The following references, cited by the Examiner, are of record in the patented file of this patent or the original patent.

UNITED STATES PATENTS

| | | | |
|---|---|---|---|
| 1,406,852 | 2/1922 | Hader et al. | 165—49 |
| 1,751,806 | 3/1930 | Fleisher | 165—16 |
| 2,167,878 | 8/1939 | Crawford | 165—45 |
| 2,179,873 | 11/1939 | Anderson et al. | 98—10 |
| 2,338,382 | 1/1944 | Marlow | 165—16 |

ROBERT A. O'LEARY, *Primary Examiner.*

CHARLES SUKALO, *Examiner.*